(12) United States Patent
Meguriya

(10) Patent No.: US 6,552,096 B2
(45) Date of Patent: Apr. 22, 2003

(54) HOLLOW FILLER-CONTAINING SILICONE RUBBER AND METHOD OF PRODUCTION

(75) Inventor: Noriyuki Meguriya, Gunma-ken (JP)

(73) Assignee: Shin-Etsu Chemical Co., Ltd., Tokyo (JP)

(*) Notice: Subject to any disclaimer, the term of this patent is extended or adjusted under 35 U.S.C. 154(b) by 0 days.

(21) Appl. No.: 09/893,572

(22) Filed: Jun. 29, 2001

(65) Prior Publication Data
US 2002/0014712 A1 Feb. 7, 2002

(30) Foreign Application Priority Data
Jun. 29, 2000 (JP) .......................... 2000-197190

(51) Int. Cl.⁷ .............................. C08J 9/236; C08J 9/32
(52) U.S. Cl. ........................ 521/54; 521/154; 523/218
(58) Field of Search ................... 521/54, 154; 523/218

(56) References Cited

U.S. PATENT DOCUMENTS

| | | | |
|---|---|---|---|
| 4,861,804 A | * | 8/1989 | Nakanishi |
| 5,246,973 A | | 9/1993 | Nakamura et al. |
| 5,580,794 A | | 12/1996 | Allen |
| 5,614,563 A | * | 3/1997 | Ishida et al. |
| 5,750,581 A | | 5/1998 | Brennenstuhl et al. |
| 5,981,610 A | * | 11/1999 | Meguriya et al. |

FOREIGN PATENT DOCUMENTS

| | | |
|---|---|---|
| JP | A5209080 | 8/1993 |
| JP | A9137063 | 5/1997 |

* cited by examiner

*Primary Examiner*—Morton Foelak
(74) *Attorney, Agent, or Firm*—Birch, Stewart, Kolasch & Birch, LLP

(57) ABSTRACT

A silicone rubber is produced by curing a silicone rubber composition which includes (A) a curable organopolysiloxane composition and (B) at least one hollow organic resin filler whereby the filler forms cells in an open-cell state. The open-cell state gives the silicone rubber good cushioning property and a low compression set.

10 Claims, No Drawings

HOLLOW FILLER-CONTAINING SILICONE RUBBER AND METHOD OF PRODUCTION

BACKGROUND OF THE INVENTION

1. Field of the Invention

The present invention relates to silicone rubber which contains one or more types of hollow organic resin filler and have at the interior an open-cell state. The invention also relates to a method of producing such silicone rubber.

2. Prior Art

Heat-curable liquid silicone rubber compositions are used in many different applications since they are effectively moldable and once molded, they provide cured products (silicone rubbers) having excellent qualities, including heat resistance, weather resistance and electrical insulating properties. One distinctive type of silicone rubber having a broad range of potential applications is sponge-like silicone rubber. In addition to possessing the above outstanding performance features of silicone rubbers (heat resistance, weather resistance, electric insulating properties, etc.), silicone rubber sponges can be made lightweight. Moreover, the inclusion of a gas in the molded material provides volumetric shrinkage qualities that enable the silicone rubber sponge to be used as an shock-absorbing, or cushioning, material. The low heat conductivity resulting from the incorporation of a gas also allows silicone rubber sponges to be used as a heat-insulating or heat-storing materials.

Such silicone rubber sponges are produced from silicone rubber compositions to which a blowing agent is added. The blowing agent may be incorporated in a number of ways, such as by adding a heat-decomposable blowing agent or by using hydrogen gas generated as a by-product during curing. Drawbacks of adding a heat-decomposable blowing agent include the toxicity and odor of the decomposition gases. When a platinum catalyst is used as the curing catalyst, an additional problem has been the inhibition of curing by the blowing agent. The use of hydrogen gas generated as a by-product of curing also presents a number of difficulties, such as the explosive nature of hydrogen gas and the special care required when handling the uncured product during storage. Another problem with using hydrogen gas generated during curing as the foaming agent, particularly when the silicone rubber composition is a liquid, is the difficulty of obtaining uniformly controlled cells. One method that provides some improvement in these respects involves incorporating within the silicone rubber composition a hollow powder made of an inorganic material such as glass or ceramic (U.S. Pat. No. 5,580,794). Yet, such inorganic materials have a high specific gravity and thus are not conducive to a sufficient reduction in the weight of the silicone rubber. Moreover, as inorganic materials, they do not adequately lower the heat conductivity and confer on the sponge only poor cushioning properties. According to another prior-art technique, described in JP-A 5-209080 corresponding to U.S. Pat. No. 5,246,973, an organic resin filler which swells under heating is included in the silicone rubber composition. Expansion is induced during curing to give a cell-containing molded product. However, this approach has a number of molding-related drawbacks, including an inability to reliably mold articles of a predetermined size and poor uniformity of curing. Another known method, described in JP-A 9-137063 corresponding to U.S. Pat. No. 5,750,581, provides for the addition of a hollow organic resin filler. However, the resulting molded material contains discrete and independent cells, and thus fails to fully overcome such shortcomings as insufficient cushioning property and a high compression set.

SUMMARY OF THE INVENTION

It is therefore an object of the present invention to provide hollow organic resin filler-containing silicone rubber which has an internally communicating state, good cushioning properties, and a low compression set. Another object of the invention is to provide a method of producing such silicone rubber.

It has been found that a silicone rubber having an internally communicating structure composed of cells in an open-cell state (that is, the structure in which each cell is connected to at least one other cell, rather than the structure in which cells are independently distributed in the silicone rubber matrix) created by inducing a gas at the interior of a hollow filler to diffuse can be produced by a method which involves curing a silicone rubber composition of (A) a curable organopolysiloxane composition and (B) at least two hollow organic resin fillers of different softening points at a temperature at which the lower softening point hollow filler collapses and the higher softening point hollow filler substantially maintains its shape.

Accordingly, the present invention provides a cured silicone rubber produced by curing a silicone rubber composition that includes (A) a curable organopolysiloxane composition and (B) at least one hollow organic resin filler. In the silicone rubber, cells formed by the filler are present in an open-cell state.

DETAILED DESCRIPTION OF THE INVENTION

Component A of the silicone rubber composition used to produce the inventive silicon rubber is a curable organopolysiloxane composition, which may be either an addition-curable or an organic peroxide-curable one.

Preferred addition-curable organopolysiloxane compositions are made of:

(1) an organopolysiloxane having at least two silicon-bonded alkenyl groups per molecule, (2) an organohydrogenpolysiloxane having at least two silicon-bonded hydrogen atoms per molecule, and (3) an addition reaction catalyst.

The organopolysiloxane having at least two silicon-bonded alkenyl groups serving as component (1) of the addition-curable organopolysiloxane composition may be a compound of the average compositional formula (1).

$$R^1_a SiO_{(4-a)/2} \tag{1}$$

In formula (1), $R^1$ which may be the same or different represents substituted or unsubstituted $C_{1-10}$, and preferably $C_{1-8}$, monovalent hydrocarbon groups. The letter a is a positive number in a range of 1.5 to 2.8, preferably 1.8 to 2.5, and most preferably 1.95 to 2.05.

Illustrative examples of the substituted or unsubstituted monovalent hydrocarbon groups bonded to silicon represented by $R^1$ include alkyl groups such as methyl, ethyl, propyl, isopropyl, butyl, isobutyl, tert-butyl, pentyl, neopentyl, hexyl, cyclohexyl, octyl, nonyl and decyl; aryl groups such as phenyl, tolyl, xylyl and naphthyl; aralkyl groups such as benzyl, phenylethyl and phenylpropyl; alkenyl groups such as vinyl, allyl, propenyl, isopropenyl, butenyl, hexenyl, cyclohexenyl and octenyl; and any of the above groups in which some or all of the hydrogen atoms are substituted with cyano groups or halogen atoms such as fluorine, bromine or chlorine, including chloromethyl, chloropropyl, bromoethyl, trifluoropropyl and cyanoethyl.

At least two of the $R^1$ groups in the above organopolysiloxane must be alkenyl groups which have preferably 2 to 8 carbons, and most preferably 2 to 6 carbons. The alkenyl group content of the organopolysiloxane is preferably 0.01 to 20 mol %, and most preferably 0.1 to 10 mol %, of all the organic groups bonded to silicon atoms (that is, of the substituted or unsubstituted monovalent hydrocarbon groups represented by $R^1$ in above average compositional formula (1)). The alkenyl groups may be bonded to silicon atoms at the ends of the molecular chain, silicon atoms located at intermediate positions along the molecular chain, or both. However, to provide a good composition curing rate and a cured product having good physical properties, it is advantageous for the organopolysiloxane used in the invention to include alkenyl groups bonded to at least the silicon atoms at the ends of the molecular chain.

The organopolysiloxane is generally a diorganopolysiloxane having a basically linear structure in which the backbone is composed of repeating diorganosiloxane units and both ends of the molecular chain are capped with triorganosiloxy groups, although the structure may be partially branched or cyclic. The degree of polymerization, or viscosity, of the alkenyl group-bearing organopolysiloxane is not critical. Use can be made of alkenyl group-bearing organopolysiloxanes ranging from those which are liquid and have a low degree of polymerization at room temperature (25° C.) to those which are gum-like and have a high degree of polymerization. Generally, one having a weight-average degree of polymerization of about 50 to 20,000, preferably about 100 to 10,000, and most preferably about 100 to 2,000, is used. At an average degree of polymerization below 50, the cured product may have inadequate rubber properties.

The organohydrogenpolysiloxane serving as component (2) of the addition-curable organopolysiloxane composition may be a compound of the average compositional formula (2).

$$R^2_b H_c SiO_{(4-b-c)/2} \qquad (2)$$

It must have at least two, preferably 2 to 300, and most preferably 3 to 120, silicon-bonded hydrogen atoms (that is, SiH groups) per molecule.

In formula (2), $R^2$ represents a substituted or unsubstituted $C_{1-10}$ monovalent hydrocarbon group which may be exemplified by the same groups as mentioned above for $R^1$ in formula (1). The letter b is a positive number from 0.7 to 2.1, and preferably 1.0 to 2.0; the letter c is a positive number from 0.001 to 1.0, and preferably from 0.01 to 1.0; and the sum b+c is a positive number from 0.8 to 3.0, and preferably from 1.5 to 2.5.

The two or more, and preferably three or more, SiH groups per molecule may be situated at the ends of the molecular chain, at intermediate positions on the chain, or at both the ends and intermediate positions. The organohydrogenpolysiloxane may have a molecular structure which is linear, cyclic, branched or a three-dimensional network structure. It is generally advantageous for the number of silicon atoms per molecule (i.e., the degree of polymerization) to be about 2 to 300, preferably about 2 to 200, more preferably about 3 to 150, and most preferably about 4 to 150, so that the organohydrogenpolysiloxane is liquid at room temperature (25° C.).

Illustrative examples of suitable organohydrogenpolysiloxanes of formula (2) include 1,1,3,3-tetramethyldisiloxane, methylhydrogencyclopolysiloxane, methylhydrogensiloxane-dimethylsiloxane cyclic copolymers, methylhydrogenpolysiloxane capped at both ends with trimethylsiloxy groups, dimethylsiloxane-methylhydrogensiloxane copolymers capped at both ends with trimethylsiloxy groups, dimethylpolysiloxane capped at both ends with dimethylhydrogensiloxy groups, dimethylsiloxane-methylhydrogensiloxane copolymers capped at both ends with dimethylhydrogensiloxy groups, methylhydrogensiloxane-diphenylsiloxane copolymers capped at both ends with trimethylsiloxy groups, methylhydrogensiloxane-diphenylsiloxane-dimethylsiloxane copolymers capped at both ends with trimethylsiloxy groups, methylhydrogensiloxane-dimethylsiloxane-diphenylsiloxane copolymers capped at both ends with dimethylhydrogensiloxy groups, copolymers composed of $(CH_3)_2HSiO_{1/2}$ units, $(CH_3)_3SiO_{1/2}$ units and $SiO_{4/2}$ units, copolymers composed of $(CH_3)_2HSiO_{1/2}$ units and $SiO_{4/2}$ units, and copolymers composed of $(CH_3)_2HSiO_{1/2}$ units, $SiO_{4/2}$ units and $(C_6H_5)_3SiO_{1/2}$ units.

The organohydrogenpolysiloxane is included in an amount of 0.1 to 50 parts by weight, and preferably 0.3 to 20 parts by weight, per 100 parts by weight of the organopolysiloxane serving as the first component of the organopolysiloxane composition. Alternatively, the organohydrogenpolysiloxane serving as the second component of the composition may be included in such an amount that the proportion of silicon-bonded hydrogen atoms (SiH groups) in the second component is about 0.5 to 5 moles, and especially about 0.8 to 2.5 moles, per mole of silicon-bonded alkenyl groups in the first component.

Suitable examples of the addition reaction catalyst serving as the third component of the organopolysiloxane composition include such platinum family metal catalysts as platinum black, platinum (IV) chloride, hexachloroplatinic acid, the reaction products of hexachloroplatinic acid with monohydric alcohols, hexachloroplatinic acid-olefin complexes, platinum-based catalysts such as platinum bis(acetoacetate), palladium-based catalysts, and rhodium-based catalysts. Such addition reaction catalysts may be used in a catalytic amount, this being typically an amount containing about 0.5 to 1,000 ppm, and preferably about 1 to 500 ppm, of the platinum family metal.

The above-described addition-curable organopolysiloxane compositions are composed solely of above components (1) to (3).

Organic peroxide-curable organopolysiloxane compositions that may be used to produce the silicone rubbers of the invention are made of:

(i) an organopolysiloxane having at least two silicon-bonded alkenyl groups per molecule, and (ii) an organic peroxide.

Component (i) is exemplified by the same organopolysiloxanes as mentioned earlier for component (1) of the above-described addition-curable organopolysiloxane compositions.

Any known organic peroxide may be used as component (ii). Examples include benzoyl peroxide, 2,4-dichlorobenzoyl peroxide, p-methylbenzoyl peroxide, o-methylbenzoyl peroxide, 2,4-dicumyl peroxide, 2,5-dimethylbis(2,5-t-butylperoxy)hexane, di-t-butyl peroxide, t-butyl perbenzoate, 1,1-bis(t-butylperoxy)-3,3,5-trimethylcyclohexane and 1,6-bis(t-butylperoxycarboxy)hexane.

The amount of organic peroxide included in the organic peroxide-curable organopolysiloxane composition may be selected as appropriate for the curing rate, although the use of 0.1 to 10 parts by weight, and especially 0.2 to 2 parts by weight, per 100 parts by weight of the organopolysiloxane of component (i) is preferred.

The organic peroxide-curable organopolysiloxane composition is composed solely of above components (i) and (ii).

The hollow organic resin filler formulated as component B with the above-described curable organopolysiloxane composition A is a filler made of an organic resin, and preferably a thermoplastic resin, which contains at the interior of the constituent particles a gas pocket and thereby lowers the specific gravity of the inventive silicone rubber, in the manner of sponge rubber. The filler is preferably made of a homopolymer of one monomer or a copolymer of two or more monomers selected from the group consisting of vinylidene chloride, acrylonitrile, methacrylonitrile, acrylates and methacrylates. A suitable material such as an inorganic filler may be applied to the surface of the hollow filler particles to strengthen them. To sufficiently lower the specific gravity and heat conductivity of the silicone rubber composition, it is recommended that the hollow filler have a true specific gravity of 0.01 to 0.5, and preferably 0.01 to 0.30. At a true specific gravity of less than 0.01, the hollow filler becomes difficult to blend and handle, in addition to which it has an inadequate strength under pressure, which may result in collapse of the filler particles during molding and thus prevent cell formation. On the other hand, a true specific gravity greater than 0.5 may fail to achieve a satisfactory open-cell structure. The hollow filler has an average particle size of preferably up to 200 μm, and most preferably from 10 to 150 μm. Hollow filler particles with a particle size larger than 200 μm may collapse under the pressure applied during molding or result in poor durability. The hollow filler is included in an amount of preferably 0.1 to 50 parts by weight, and most preferably 0.2 to 30 parts by weight, per 100 parts by weight of the organopolysiloxane composition, and preferably such as to account for 10 to 80% of the volume of the overall silicone rubber composition. Less than 10% by volume of the hollow filler may lead to such drawbacks as a low specific gravity, low heat conductivity and insufficient cushioning property. On the other hand, at more than 80% by volume, molding and blending often become difficult to carry out, in addition to which the molded material tends to be brittle and lacking in rubber elasticity.

The average particle size described above may be determined, for example, as a weight-average value (median diameter) with the aid of a particle size distribution instrument that employs an analytical technique such as laser light diffraction.

A single type of hollow filler may be used alone, or two or more types may be used in combination. The hollow filler has a softening point within a range of preferably 50 to 200° C., and especially 80 to 180° C. When two or more hollow fillers are used, the difference in softening point between the hollow filler having the highest softening point and the hollow filler having the lowest softening point is preferably 5 to 100° C., more preferably 10 to 80° C., and most preferably 20 to 60° C. A softening point difference within this range ensures to create an open-cell structure in the silicone rubber formed by collapse of at least the lowest softening point hollow filler during heating and curing of the silicone rubber composition.

It is advantageous for the silicone rubber composition containing above components A and B to optionally include (C) a polyhydric alcohol or a derivative thereof. Component C acts as a cell-connecting additive which promotes the formation of an interconnected (open) cell structure from an independent (closed) cell structure during heating and curing of the hollow filler-containing silicone rubber composition.

Polyhydric alcohols that are suitable as component C include monomers having at least two alcoholic hydroxyl groups, as well as oligomers and polymers thereof. Illustrative examples include polyhydric alcohols such as glycerol, ethylene glycol, propylene glycol, pentaerythritol and glycerol α-monochlorohydrin; dimers, trimers and other oligomers of the above polyhydric alcohols, such as diethylene glycol, triethylene glycol and dipropylene glycol; homopolymers or copolymers of two or more of the above polyhydric alcohols, such as polyethylene glycol, polypropylene glycol and crown ethers; partial ethers and partial polyethers of the above polyhydric alcohols, such as ethylene glycol monoethyl ether, ethylene glycol monophenyl ether, diethylene glycol monomethyl ether, dipropylene glycol monoethyl ether and pentaerythritol ethoxylate; partial esters and partial silylates of the above polyhydric alcohols, such as glycerol monoacetate, glycerol diacetate and ethylene glycol monoacetate; and various nonionic surfactants. To promote the formation of an open cell structure, it is advantageous for such oligomers or polymers to have a degree of polymerization within a range of about 2 to 15, preferably about 2 to 10, and most preferably about 2 to 5.

Such additives are typically included in an amount of 50 parts by weight or less (i.e., 0 to 50 parts by weight), usually 0.2 to 50 parts by weight, preferably 0.5 to 30 parts by weight, and most preferably 1.0 to 20 parts by weight, based on the curable organopolysiloxane composition serving as component A. When the amount is too small, the open cell-forming effect may become negligible, whereas at more than 50 parts by weight, the additive tends to excessively compromise the rubber properties of the silicone rubber.

The silicone rubber composition may optionally include (D) a blowing agent. During curing of the rubber, the blowing agent generates a gas which interconnects the cells formed by the hollow filler. The blowing agent employed for this purpose may be any suitable blowing agent that can ordinarily be used in silicone rubber. Illustrative examples include organic azo compounds such as azobisisobutyronitrile, 2,2'-azobis-2-methylbutyronitrile, 2,2'-azobis-2,4-dimethylvaleronitrile, 1,1-azobis(1-acetoxy-1-phenylethane) and azodicarbonamide, nitroso compounds such as dinitrosopentamethylene tetramine, and hydrazine derivatives such as 4,4'-oxybis(benzenesulfonyl hydrazide) and p-toluenesulfonyl hydrazine.

The amount of blowing agent added is typically about 1/5th to 1/100th the amount ordinarily used to form sponge rubber. Specifically, the addition of 5 parts by weight or less (i.e., 0 to 5 parts by weight), preferably 0.001 to 5 parts by weight, and especially 0.005 to 1 part by weight, of the blowing agent per 100 parts by weight of the organopolysiloxane composition serving as component A is preferred.

If necessary, other components may also be incorporated in the silicone rubber composition used to produce the inventive silicone rubber, including fillers such as silica fine powder and calcium carbonate, reinforcements such as silicone resins, electrical conductivity-imparting agents (e.g., carbon black, conductive zinc white and metal powders), hydrosilylation reaction regulators (e.g., acetylene compounds, phosphorus compounds, nitrile compounds, carboxylates, tin compounds, mercury compounds and sulfur compounds), heat stabilizers such as iron oxide and cerium oxide, internal parting agents such as dimethylsilicone oil, tackifiers, and thixotropic agents.

No particular limitation is imposed on the method of producing the silicone rubber having an internally communicating structure (open-cell structure (that is, the structure in which each cell is connected to at least one other cell, rather than the structure in which cells are independently distributed in the silicone rubber matrix)), although the inclusion of above components C and D allows cells from the hollow filler to be effectively placed in an interconnected, open-cell state. It is especially preferable to cure a silicone rubber composition comprising (A) a curable organopolysiloxane composition and (B) at least two hollow organic resin fillers of different softening points at a temperature at which the low softening point hollow filler collapses and the high softening point hollow filler substantially maintains its shape. That is, by using at least two hollow organic resin fillers of different softening points and causing some or substantially all of the hollow filler having the lower softening point to collapse or shrink during molding, the air at the interior of the latter filler disperses within the matrix of the organopolysiloxane cured product, resulting in the formation of open cells. Hence, it is advantageous for the curing temperature to be at or above the temperature at which the hollow filler having the lower softening point collapses, such as a temperature not less than 20° C. lower, preferably not less than 10° C. lower, and most preferably at or above, the softening point of the lower softening point filler. The curing temperature has an upper limit which is preferably not more than 20° C. higher, more preferably not more than 10° C. higher, and most preferably at or below, the softening point of the higher softening point filler.

The silicone rubber of the invention has a percent weight gain, when immersed 24 hours in methanol at 25° C., of preferably at least 4% and most preferably at least 5%, but preferably not more than 100%. If the weight gain is less than 4%, the cells created by the hollow filler do not form a substantially open-cell structure within the silicone rubber matrix. Instead, most of the cells exist independent of each other, giving the silicone rubber a poor compression set when subjected to an applied pressure.

The percent weight gain from methanol immersion is an indicator of the degree to which the silicone rubber is open-celled. The percent weight gain was measured as follows.

Measurement of Percent Weight Gain:

Disk-shaped test pieces having a diameter of about 29 mm and a thickness of about 12.5 mm for use in compression set measurement as described in JIS K6249 were fabricated. The test pieces were immersed in 500 g of methanol within a 1-liter metal pot, following which the cover was closed and the pot was held at 25° C. The weight of the test pieces before and after 24 hours of immersion were measured, based on which the percent weight gain was calculated as shown in the formula below. Test pieces which floated to the surface on account of their low specific gravity were kept completely immersed by covering the top of the methanol with a wire mesh.

$$\text{percent weight gain } (\%) = \frac{[\text{weight after 24 hours immersion}] - [\text{weight before immersion}]}{[\text{weight before immersion}]} \times 100$$

A weight gain of at least 4%, and preferably at least 5%, but not more than 100% indicates that the silicone rubber matrix is open-celled to a degree capable of providing good cushioning property and a low compression set.

The silicone rubber of the invention has good cushioning property and a low compression set because the cells in the rubber exist in an open-cell state. By virtue of its low compression set, the inventive silicone rubber can be used in a wide range of applications, including various types of gaskets, seals and thermal fixing rollers for printers and copiers; substrates of oil-coating rollers or the like which gradually discharge various liquid agents such as oils and perfumes therefrom because of their open-cell structure; and shock absorbing materials which make use of the ability of the silicone rubber to admit and release gases.

EXAMPLES

The following examples and comparative examples, wherein all parts are by weight, are provided to illustrate the invention and are not intended to limit the scope thereof. References in the examples to the amount of hollow filler in volume percent (vol %) are based on the volume of the overall silicone rubber composition.

Example 1

The following ingredients were mixed at room temperature for 30 minutes: 68 parts of a dimethylpolysiloxane (1) capped at both ends with dimethylvinylsiloxy groups and having a viscosity of 5,000 poise at 25° C., 32 parts of fumed silica having a specific surface area of 200 $m^2/g$ (Aerosil 200, produced by Nippon Aerosil Co., Ltd.), 5 parts of hexamethyldisilazane, 0.5 part of divinyltetramethyldisilazane, and 2.0 parts of water. The temperature of the mixture was then raised to 150° C., and mixing was continued for another 3 hours, following which the mixture was cooled, thereby giving a silicone rubber base.

Fifty parts of the resulting silicone rubber base, 50 parts of a dimethylpolysiloxane (2) capped at both ends with dimethylvinylsiloxy groups and having a viscosity at 25° C. of 1,000 poise, 2 parts (corresponding to 35 vol %) of a hollow thermoplastic resin filler (Expancel 551DE, available from Expancel) having a specific gravity of 0.04, a softening point of 130 to 150° C. and an average particle size of 40 μm, and 4 parts of triethylene glycol were then placed in a planetary mixer and mixed for 30 minutes. To the resulting mixture were added 3.5 parts of a methylhydrogenpolysiloxane (3) having SiH groups at both ends and on side chains (degree of polymerization, 17; amount of SiH, 0.0060 mol/g) as the crosslinking agent and 0.05 part of ethynylcyclohexanol as the reaction regulator, and mixing was continued for 15 minutes to give a silicone rubber composition.

Next, 0.1 part of a platinum catalyst (platinum concentration, 1%) was mixed into the silicon rubber composition, following which the composition was press-cured at 120° C. for 15 minutes, and post-cured in a 200° C. oven for 4 hours.

The specific gravity, hardness and compression set (at 150° C. for 22 hours, and at 180° C. for 22 hours) of the cured silicone rubber were measured in accordance with JIS K6249. The percent weight gain during methanol immersion was also measured. The results are shown in Table 1.

Example 2

The following ingredients were mixed at room temperature for 30 minutes: 65 parts of the same dimethylpolysiloxane (1) as in Example 1, 35 parts of fumed silica having a specific surface area of 300 $m^2/g$ (Aerosil 300, produced by Nippon Aerosil Co., Ltd.), 6 parts of hexamethyldisilazane, 0.5 part of divinyltetramethyldisilazane, and 2.0 parts of water. The temperature was then raised to 150° C., and mixing was continued for another 3 hours, following which the mixture was cooled, thereby giving a silicone rubber base.

Fifty parts of the resulting silicone rubber base, 50 parts of a dimethylpolysiloxane (4) capped at both ends with dimethylvinylsiloxy groups and having a viscosity at 25° C. of 100,000 poise, 2.8 parts (corresponding to 60 vol %) of a hollow thermoplastic resin filler having a specific gravity of 0.02, a softening point of 140 to 160° C. and an average particle size of 90 μm (Microsphere F-80ED, available from Matsumoto Yushi-Seiyaku Co., Ltd.), and 10 parts of glycerol were then placed in a planetary mixer and mixed for 30 minutes. The resulting mixture then had added thereto 2.0 parts of a methylhydrogenpolysiloxane (3) having SiH groups at both ends and on side chains (degree of polymerization, 17; amount of SiH, 0.0060 mol/g) as the crosslinking agent and 0.05 part of ethynylcyclohexanol as the reaction regulator, and mixing was continued for 15 minutes to give a silicone rubber composition.

Next, 0.1 part of a platinum catalyst (platinum concentration, 1%) was mixed into the silicon rubber composition, and the composition was cured under the same conditions as in Example 1.

The specific gravity, hardness and compression set (at 150° C. for 22 hours, and at 180° C. for 22 hours) of the cured silicone rubber were measured as in Example 1. The percent weight gain during methanol immersion was also measured. The results are shown in Table 1.

Example 3

The following ingredients were mixed at room temperature for 30 minutes: 70 parts of the same dimethylpolysiloxane (1) as in Example 1, 30 parts of precipitated silica having a specific surface area of 200 m²/g (Nipsil LP, manufactured by Nippon Silica Industrial Co., Ltd.), 3 parts of hexamethyldisilazane, 0.5 part of divinyltetramethyldisilazane, and 1.0 part of water. The temperature was then raised to 150° C., and mixing was continued for another 3 hours, following which the mixture was cooled, thereby giving a silicone rubber base.

Seventy parts of the resulting silicone rubber base, 30 parts of the same dimethylpolysiloxane (2) as in Example 1, 3.0 parts (corresponding to 65 vol %) of the same hollow thermoplastic resin filler (Microsphere F-80ED, available from Matsumoto Yushi-Seiyaku Co., Ltd.) as in Example 2, and 4 parts of pentaerythritol ethoxylate (molecular weight, 797; Aldrich catalog No. 41,873-0) were then placed in a planetary mixer and mixed for 30 minutes. The resulting mixture then had added thereto 3.2 parts of a methylhydrogenpolysiloxane (3) having SiH groups at both ends and on side chains (degree of polymerization, 17; amount of SiH, 0.0060 mol/g) as the crosslinking agent and 0.05 part of ethynylcyclohexanol as the reaction regulator, and mixing was continued for 15 minutes to give a silicone rubber composition.

Next, 0.1 part of a platinum catalyst (platinum concentration, 1%) was mixed into the silicon rubber composition, and the composition was cured under the same conditions as in Example 1.

The specific gravity, hardness and compression set (at 150° C. for 22 hours, and at 180° C. for 22 hours) of the cured silicone rubber were measured as in Example 1. The percent weight gain during methanol immersion was also measured. The results are shown in Table 1.

Example 4

The following ingredients were placed in a planetary mixer and mixed for 30 minutes: 92 parts of a dimethylpolysiloxane (1) capped at both ends with trivinylsiloxy groups and having a viscosity at 25° C. of 10,000 poise, 8 parts of fumed silica which has a specific surface area of 110 m²/g and whose surface has been hydrophobically treated (Aerosil R-972, manufactured by Nippon Aerosil Co., Ltd.), 2.5 parts of the same hollow thermoplastic resin filler as in Example 2 (Microsphere F-80ED, available from Matsumoto Yushi-Seiyaku Co., Ltd.), and 0.5 part of a hollow thermoplastic resin filler having a specific gravity of 0.04, an average particle size of 50 μm and a softening point of 100 to 110° C. (Microsphere F-50ED, available from Matsumoto Yushi-Seiyaku Co., Ltd.). Next, 0.8 part of tert-butylperoxyisopropyl monocarbonate (Perbutyl I, available from NOF Corporation) was added as a crosslinking agent and mixing was continued for 15 minutes to give a silicone rubber composition.

The resulting silicone rubber composition, in which the two types of hollow fillers together accounted for 65% of the volume, was press-cured at 140° C. for 10 minutes, and post-cured in a 200° C. oven for 4 hours.

The cured silicone rubber was measured for specific gravity, hardness and compression set (at 150° C. for 22 hours, and at 180° C. for 22 hours) in accordance with JIS K6249, and for methanol immersion weight gain. The results are shown in Table 1.

Example 5

A rubber compound was prepared by mixing the following ingredients: 100 parts of a rubbery diorganopolysiloxane having an average degree of polymerization of about 8,000 and composed of 99.825 mol % of dimethylsiloxane units, 0.15 mol % of methylvinylsiloxane units and 0.025 mol % of dimethylvinylsiloxy units, 5 parts of dimethylpolysiloxane (average degree of polymerization, 10) capped with terminal silanol groups, and 25 parts of fumed silica having a specific surface area of 200 m²/g (Nippon Aerosil Co., Ltd.).

Next, a silicone rubber composition was prepared by uniformly dispersing 2.0 parts (corresponding to 50 vol %) of the same hollow thermoplastic resin filler as in Example 2 (Microsphere F-80ED, available from Matsumoto Yushi-Seiyaku Co., Ltd.) and 0.1 part of azobisisobutyronitrile as the blowing agent in 100 parts of the above rubber compound on a two-roll mill, then adding and uniformly dispersing 0.5 part of 2,5-dimethylbis(2,5-tert-butylperoxy)hexane on the two-roll mill.

The resulting silicone rubber composition was then press-cured at 170° C. for 10 minutes, and post-cured in a 200° C. oven for 4 hours.

The cured silicone rubber was measured for specific gravity, hardness and compression set (at 150° C. for 22 hours, and at 180° C. for 22 hours) in accordance with JIS K6249, and for methanol immersion weight gain. The results are shown in Table 1.

Example 6

The following ingredients were mixed at room temperature for 30 minutes: 65 parts of the same dimethylpolysiloxane (1) as in Example 1, 35 parts of fumed silica having a specific surface area of 300 m²/g (Aerosil 300, produced by Nippon Aerosil Co., Ltd.), 6 parts of hexamethyldisilazane, 0.5 part of divinyltetramethyldisilazane, and 2.0 parts of water. The temperature was then raised to 150° C., and mixing was continued for another 3 hours, following which the mixture was cooled, thereby giving a silicone rubber base.

Fifty parts of the resulting silicone rubber base, 50 parts of a dimethylpolysiloxane (4) capped at both ends with dimethylvinylsiloxy groups and having a viscosity at 25° C. of 100,000 poise, 18 parts (corresponding to 60 vol %) of a hollow thermoplastic resin filler (Microsphere MFL-100CA, available from Matsumoto Yushi-Seiyaku Co., Ltd.) coated on the surface with calcium carbonate and having a specific gravity of 0.13, a softening point of 160 to 170° C. and an average particle size of 100 $\mu$m, and 5 parts of ethylene glycol were then placed in a planetary mixer and mixed for 30 minutes. The resulting mixture then had added thereto 2.0 parts of a methylhydrogenpolysiloxane (3) having SiH groups at both ends and on side chains (degree of polymerization, 17; amount of SiH, 0.0060 mol/g) as the crosslinking agent and 0.05 part of ethynylcyclohexanol as the reaction regulator, and mixing was continued for 15 minutes to give a silicone rubber composition.

Next, 0.1 part of a platinum catalyst (platinum concentration, 1%) was mixed into the silicon rubber composition, and the composition was cured under the same conditions as in Example 1.

The specific gravity, hardness and compression set (at 150° C. for 22 hours, and at 180° C. for 22 hours) of the cured silicone rubber were measured as in Example 1. The percent weight gain during methanol immersion was also measured. The results are shown in Table 1.

Comparative Example 1

The same procedure was followed as in Example 1, except that curing was carried out without the addition of triethylene glycol. The results are shown in Table 1.

Comparative Example 2

The same procedure was followed as in Example 2, except that curing was carried out without the addition of glycerol. The results are shown in Table 1.

Comparative Example 3

The same procedure was followed as in Example 3, except that curing was carried out without the addition of pentaerythritol ethoxylate. The results are shown in Table 1.

Comparative Example 4

The same procedure was followed as in Example 4, except that curing was carried out without the addition of Microsphere F-50ED. The results are shown in Table 1.

Comparative Example 5

The same procedure was followed as in Example 5, except that curing was carried out without the addition of azobisisobutyronitrile as the blowing agent. The results are shown in Table 1.

Comparative Example 6

The same procedure was followed as in Example 6, except that curing was carried out without the addition of ethylene glycol. The results are shown in Table 1.

TABLE 1

|  | Example | | | | | |
|---|---|---|---|---|---|---|
|  | 1 | 2 | 3 | 4 | 5 | 6 |
| Weight gain when immersed in methanol (%) | 18.0 | 7.5 | 12.9 | 6.8 | 5.2 | 14.5 |

TABLE 1-continued

| Specific gravity | 0.75 | 0.63 | 0.59 | 0.62 | 0.68 | 0.61 |
| Hardness (Durometer A) | 27 | 27 | 28 | 33 | 35 | 31 |
| Compression set (150° C., 22 hrs) | 17 | 22 | 19 | 29 | 32 | 21 |
| Compression set (180° C., 22 hrs) | 39 | 41 | 35 | 35 | 51 | 39 |

|  | Comparative Example | | | | | |
|---|---|---|---|---|---|---|
|  | 1 | 2 | 3 | 4 | 5 | 6 |
| Weight gain when immersed in methanol (%) | 3.4 | 3.2 | 3.9 | 3.6 | 2.8 | 2.9 |
| Specific gravity | 0.76 | 0.61 | 0.58 | 0.68 | 0.74 | 0.62 |
| Hardness (Durometer A) | 34 | 30 | 32 | 35 | 40 | 37 |
| Compression set (150° C., 22 hrs) | 79 | 82 | 94 | 75 | 72 | 80 |
| Compression set (180° C., 22 hrs) | 98 | 100 | 100 | 95 | 86 | 91 |

Japanese Patent Application No. 2000-197190 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

What is claimed is:

1. A method of producing a silicone rubber, said method comprising the step of curing a silicone rubber composition comprising (A) a curable organopolysiloxane composition and (B) at least two hollow organic resin fillers of different softening points, at a temperature at which the lower softening point hollow filler collapses and the higher softening point hollow filler substantially maintains its shape.

2. A silicone rubber produced by curing a silicone rubber composition comprising
   (A) a curable organopolysiloxane composition, and
   (B) at least two different hollow organic resin fillers whose difference of softening point between the lower softening point hollow filler and the higher softening point hollow filler is 5 to 100° C.,
   in which silicone rubber the filler forms cells in an open-cell state.

3. The silicone rubber of claim 2, wherein the hollow organic resin filler has a specific gravity of 0.01 to 0.3 and has an average particle size of 10 to 200 $\mu$m.

4. The silicone rubber of claim 2, wherein the hollow organic resin filler is a homopolymer of a single monomer or a copolymer of at least two monomers selected from the group consisting of vinylidene chloride, acrylonitrile, methacrylonitrile, acrylates, and methacrylates.

5. The silicone rubber of claim 2, wherein the curable organopolysiloxane composition is an addition-curable organopolysiloxane composition comprising:
   (1) an organopolysiloxane having at least two silicon-bonded alkenyl groups per molecule,
   (2) an organohydrogenpolysiloxane having at least two silicone-bonded hydrogen atoms per molecule, and
   (3) an addition reaction catalyst.

6. The silicone rubber of claim 2, wherein the curable organopolysiloxane composition is an organic peroxide-curable organopolysiloxane composition comprising:
   (i) an organopolysiloxane having at least two silicon-bonded alkenyl groups per molecule, and
   (ii) an organic peroxide.

7. The silicone rubber of claim 2, which has a percent weight gain of at least 4% when immersed in methanol at 25° C. for 24 hours.

8. The silicon rubber of claim 2, wherein the difference the difference in softening point between the lower softening point hollow filler and the higher softening point hollow filler is 20 to 60° C.

9. The silicon rubber of claim 2, wherein the hollow filler accounts for 10% to 80% of the volume of the overall silicone rubber composition.

10. The silicone rubber of claim 2, wherein the compression set thereof at 180° C. for 22 hours ranges from 35–51.

* * * * *